United States Patent

Sygnator

[11] 3,982,464
[45] Sept. 28, 1976

[54] DRILLING AND REAMING
[75] Inventor: Henry Anton Sygnator, Arlington Heights, Ill.
[73] Assignee: Illinois Tool Works Inc., Chicago, Ill.
[22] Filed: Aug. 28, 1975
[21] Appl. No.: 608,427

[52] U.S. Cl. ............................... 85/47; 408/224; 408/226; 408/230
[51] Int. Cl.² .......................................... F16B 25/00
[58] Field of Search .......... 408/216, 217, 219, 220, 408/223, 224, 225, 230; 85/41, 47

[56] References Cited
UNITED STATES PATENTS

| 2,897,696 | 8/1959 | Tisserant | 408/225 |
|---|---|---|---|
| 3,358,548 | 12/1967 | Dyslin | 85/47 |
| 3,665,801 | 5/1972 | Gutshall | 408/230 |
| 3,699,841 | 10/1972 | Lanius | 85/41 |
| 3,758,222 | 9/1973 | Oakes | 408/224 |
| 3,869,219 | 3/1975 | Wilson et al. | 85/47 X |

Primary Examiner—Othell M. Simpson
Assistant Examiner—Fred A. Silverberg
Attorney, Agent, or Firm—T. W. Buckman; R. W. Beart

[57] ABSTRACT

A self-drilling and reaming screw for clampingly securing a plurality of superimposed panels and providing a clearance hole in at least the upper panel. A plurality of axially spaced wings of differing and increasing radial dimension from the cutting edge of the drill point to the threaded shank portion are provided and located between the upper and lower extremities of the flutes on the drill point.

3 Claims, 6 Drawing Figures

U.S. Patent   Sept. 28, 1976   3,982,464
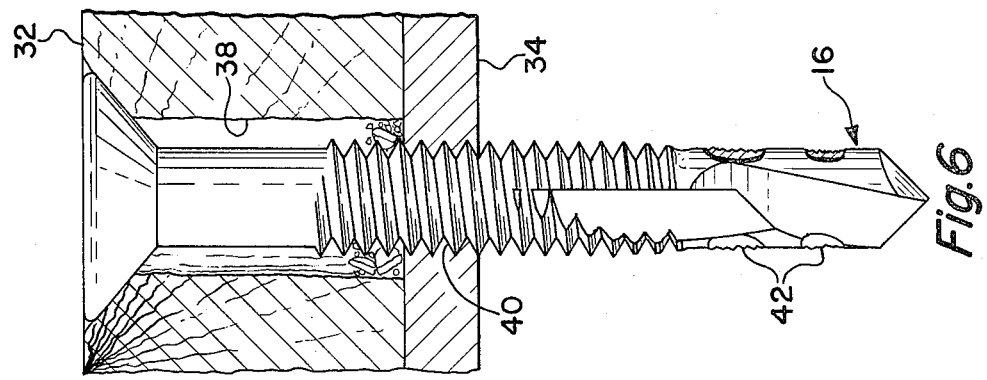
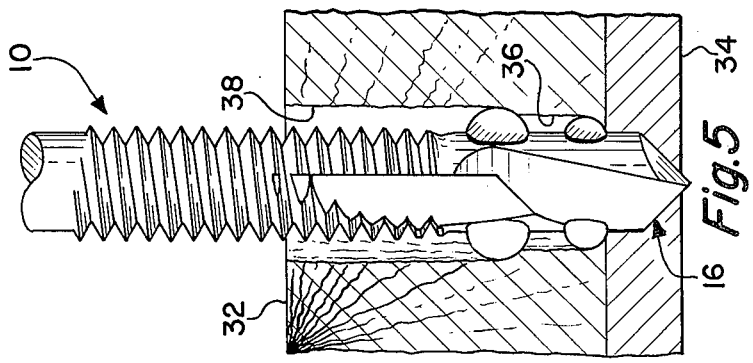
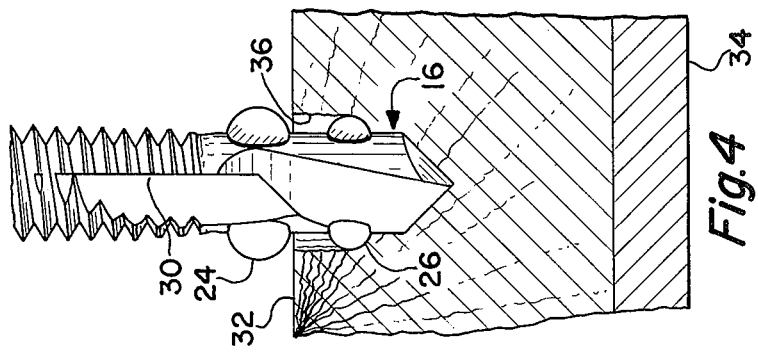
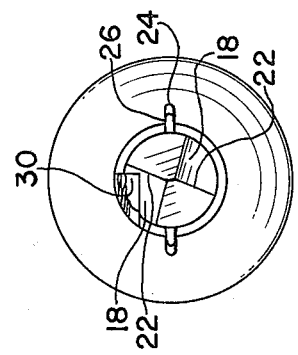
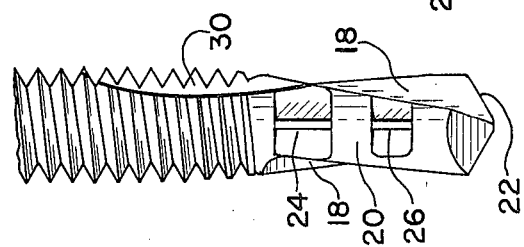
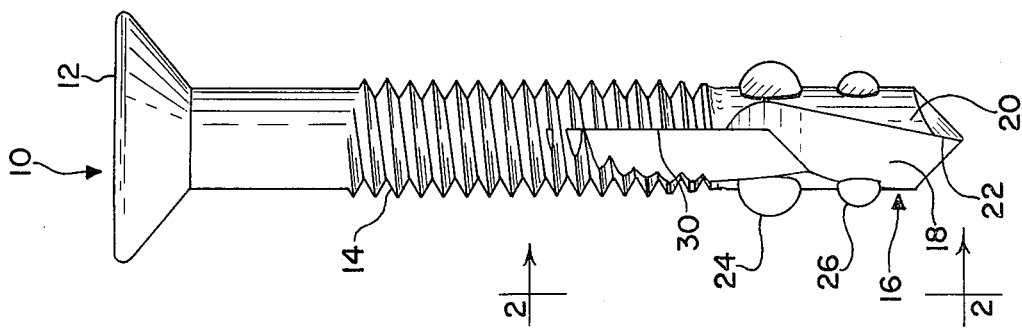

DRILLING AND REAMING

This invention relates to a drill screw and more particularly to a screw which will ream a clearance hole in an upper panel and clamp the upper panel to a lower panel of harder material.

It is frequently desired to clamp a plurality of superimposed panels together, the bottommost panel being of a harder material than the uppermost panel. A wood panel superimposed over a steel support surface is a typical combination of materials. In such installations, it is desirable to provide a clearance hole in the upper panel during the drilling operation so that there will be no thread engagement in the upper panel, thus insuring that the panels will be clamped tightly together as the fastener drills and taps a hole in the lower panel.

Certain applications involve the use of relatively hard wood or other hard material as the top panel, thus creating a problem in reaming a clearance hole in this top panel. Radially extending reaming wings on a drill screw body must be strong enough to ream the hole in the wood but yet weak enough to fracture when they abut the steel plate. This creates a design problem which has not been satisfactorily solved. Prior art efforts to date include the placement of the wings at an angle to the longitudinal axis of the shank in an effort to increase the reaming strength of the wing. This allows the thickness of the wing to be increased substantially. However, such a design still produces a substantial amount of heat when a relatively large amount of material is to be removed during the reaming operation.

Additional problems in such applications occur when the uppermost panel is of a material which is not readily exited from the hole, such as a wood with a heavy pitch concentration. Such material tends to stick and be retained in the drill flute almost immediately after it is drilled and thus clogs the path of removal from the hole. When material does not freely exit, the drill point encounters substantial friction and accompanying heat and will not drill effectively.

Prior art screws have also utilized a pair of diametrically opposed wings located within the longitudinal extent of the flute, thus providing a somewhat freer exit of material. However, such a configuration still requires a rather large removal of material by a single set of wings and apparently does not totally solve the problem of drilling in material which does not tend to exit freely from the drilled hole.

Accordingly, it is an object of this invention to provide a threaded fastener which will drill and ream in a single operation and in a manner which will insure efficient removal of material from the reamed hole.

A further object of the invention is to provide a drilling and reaming screw which minimizes the heat generated during the drilling and reaming operation.

A further important object of the invention is to provide an increasing capacity for the removal of chips from the drilled area as the screw progresses through the workpiece.

An important advantage of the present invention is the provision of a drilling and reaming screw capable of satisfactorily reaming a clearance hole in a panel which is of a hard wood material or other material which is difficult to efficiently drill and ream in a single operation.

The above objects and advantages are obtained and problems in the prior art will be overcome by the present invention which incorporates at least two reaming wings on the shank of a fastener both of which are located between the uppermost and lowermost extremities of the flute in the drill point and which are of differing and increasing radial dimension from the cutting edge toward the threaded shank. Such a configuration decreases the amount of material required to be removed by each wing and thus minimizes the heat generated by each wing during the reaming process. The wings may consist of pairs of diametrically opposed wings to further decrease the amount of material removing capabilities required by each individual wing. A further aspect of the invention is the location of a thread cutting slot so that it intersects at least one of the flutes on the drill point thus serving to effectively increase the fluting capabilities at that area while continuing to provide the necessary thread cutting capabilities in such a screw. In addition to allowing the material to be removed in smaller quantities through the use of two or more successively larger and axially spaced wings, the placement of the wings within the extremities of the drill flute provides successively increasing areas into which chips may flow away from the cutting edge of the drill point. This becomes important when reaming a hole in a relatively thick panel or in a panel which is of a material which is difficult to freely exhaust, such as wood containing a large concentration of pitch or other gummy material.

Still other objects and advantages of this invention will become apparent to those skilled in the art when the specification and claims are read in conjunction with the accompanying drawings wherein;

FIG. 1 is an elevational view of a drilling and reaming screw embodying the features of this invention.

FIG. 2 is a partial elevational view of the screw shown in FIG. 1 rotated 90° and viewed along the lines 2—2 of FIG. 1.

FIG. 3 is an end view of the screw shown in FIG. 1.

FIGS. 4 and 5 are elevational views in partial section showing the application of the screw embodying the principles of the invention through a pair of adjacent panels and at successively deeper penetration levels into the panels.

FIG. 6 is an elevational view in partial section of the screw in a final clamping position through the panels.

Referring now to the drawings wherein similar parts bear similar numerals, a screw-type fastener 10 embodying the principles of the invention includes an enlarged driving head 12 with suitable wrenching surfaces thereon or therein, a threaded shank portion 14 and a drilling tip 16 at the entering end of the screw. The drilling tip 16 will typically include a pair of terminal cutting edges 22 and associated longitudinally extending flutes 18 permitting material to be exited or discharged from the vicinity of the hole being cut.

Reaming wings 24 and 26 are formed on the shank portion 20 between opposing flutes 18 and positioned so that they are intermediate the uppermost extremity and lowermost extremity of the flute 18. Wings 24 and 26 are preferably axially spaced from one another and the lowermost wings 26 adjacent the cutting edge will be of a radial dimension greater than that defined by the cutting edge but less than the radial dimension of the uppermost wing 24. It should be understood that while diametrically opposed pairs of wings 24 and 26 are shown, any combination of wings at different axial locations and of differing and increasing radial extent from the tip upwardly will accomplish the purposes of this invention.

Wings 24 and 26 may typically be formed by a pinching operation and this invention allows them to be formed thin enough so that they fracture from the shank upon abutment with a lowermost workpiece 34 in a manner to be described later herein.

The particular application and advantages of the present invention can best be illustrated with reference to FIGS. 4–6. The pair of panels 32 and 34 to be joined together will typically comprise a softer material, such as wood, as the upper panel and a harder, steel, material 34 as the bottommost panel. To prevent a spacing of the panels when they are fastened with a screw, a clearance hole must be provided in the uppermost panel. The fastening operation is initiated by the drill point 16 contacting the panel 32 immediately followed by the reaming action of smaller wings 26. These wings are designed to remove a relatively small amount of material in forming bore 36 and provide an area adjacent the cutting tip 22 to receive any excess chip material which is not accommodated in the flutes 18. Since the upper wings 24 and lower wings 26 will preferably be axially spaced from one another, a reservoir is thus formed in this area. Following the operation of the lower wings 26, the upper wings 24 will complete the reaming operation to the desired larger diameter bore 38. Since the wings 26 have initially removed a portion of the material, the load on the wings 24 will be decreased. Thus, each wing 24 and 26 serves to distribute the work required in the boring operation and the strength required and accompanying thickness of each individual wing can be minimized while minimizing the heat generated during the reaming operation. Since the material removing wings 24 and 26 are located within the extremities of the flutes, the exiting of the material is not impeded and, in fact, enhanced through the creation of auxiliary chip removing reservoirs and exhaust capabilities.

Axially spaced wings 24 and 26 also serve to guide and stabilize the entry of the fastener into the workpieces and prevents the fastener from tilting substantially from a predetermined center line due to the plurality of axially spaced contact points provided by the wings.

Upon the abutment of wings 26 and 24 with the lowermost work panel 34, each wing will successively fracture and become disassociated from the shank at 42, permitting the thread cutting slot 30 to form a tapped hole 40 in the sheet metal plate and allow the fastener to clamp the panel 32 against the sheet metal plate 34.

In conjunction with this capability, it should be recognized that the positioning of the thread cutting slot 30, so that it intersects flute 18, insures that a maximum number of full threads are available for a given threaded shank length and thereby serving to maximize the stipping torque in the fastening joint. In addition to this feature, slot 30 intersecting flute 18 provides yet another chip exhaust capability to the system by effectively increasing the flute length of flute 18 and providing a further reservoir into which chips may flow. Thus, the chip exhaust capabilities of the present invention are increased over the prior art by providing four chip receiving and exhaust areas. The first area being the conventional fluting provided by flute 18. The second area being the relatively small clearance hole 36 and reservoir provided by the small wings 26 which are located adjacent the cutting edge 22. The third area being the larger clearance hole 38 and reservoir created by larger wings 24. The fourth such area being the chip exhaust capability created by the thread cutting sot 30.

Thus it is apparent that there has been provided, in accordance with the invention, a drilling and reaming screw that fully satisfies the objects and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

I claim:

1. A drilling and reaming screw including a threaded shank intermediate a driving head and a generally cylindrical drill point including a pair of flutes each terminating in radially extending cutting edges and formed in opposing quadrants of the cylindrical drill point between a pair of lands in opposing quadrants of the cylindrical drill point, a transverse dimension defined by the opposing land portions being substantially constant over an axial extent of the drill point and said transverse dimension being substantially equal to the radial dimension defined by the radially extending cutting edges, the flutes having an uppermost extremity and a lowermost extremity terminating at said cutting edge, at least two reaming wings each of a predetermined, limited, thickness, radial extent and longitudinal extent formed on the land portions of the drill point of the screw and at different axial locations thereon, the at least two reaming wings located intermediate the uppermost and lowermost extremities of the drilling flutes, a first of the two reaming wings located adjacent the cutting edge and being of a first radial dimension greater than the radial dimension of the cutting edge, a second of the two reaming wings located adjacent the uppermost extremity of the flute and being of a second radial dimension greater than the first radial dimension, the lowermost extremity of the second reaming wing being spaced axially from the uppermost extremity of the first reaming wing permitting the region formed by said lowermost extremity, said uppermost extremity and the section of the land therebetween to define a chip exhaust reservoir when operatively associated with a work panel, all of said at least two reaming wings being frangibly associated with the shank of the screw so that two or more juxtaposed work panels may be fastened by providing a clearance hole in a first of said work panels while minimizing the heat generated therefrom and separating the wings from the shank when they abut a second, harder, work panel.

2. The drilling and reaming screw of claim 1, including a pair of diametrically opposed first wings and a pair of diametrically opposed second wings.

3. A drilling and reaming screw including a threaded shank intermediate a driving head and a drill point, the drill point including at least one cutting edge and associated flute, the flute having an uppermost extremity and a lowermost extremity terminating at said cutting edge, at least two reaming wings formed on the drill point of the screw and at different axial locations thereon, the at least two reaming wings located intermediate the uppermost and lowermost extremities of the drilling flutes, a first of the two reaming wings located adjacent the cutting edge and being of a first radial dimension greater than the radial dimension of the cutting edge, a second of the two reaming wings located adjacent the uppermost extremity of the flute and being of a second radial dimension greater than the first radial dimension, a thread cutting slot extending longitudinally of the shank intersecting the threaded shank portion and flute therein forming an extension of the flute, all of said at least two reaming wings being frangibly associated with the shank of the screw so that two or more juxtaposed work panels may be fastened by providing a clearance hole in a first of said work panels while minimizing the heat generated therefrom and separating the wings from the shank when they abut a second, harder, work panel.

* * * * *